United States Patent Office 3,130,011
Patented Apr. 21, 1964

3,130,011
PRODUCTION OF SILICON HALIDES
Arthur Wallace Evans, Nunthorpe, and Kenneth Arkless, Stockton-on-Tees, England, assignors to British Titan Products Company Limited, Durham, England, a company of Great Britain
No Drawing. Filed Aug. 31, 1959, Ser. No. 836,940
Claims priority, application Great Britain Sept. 17, 1958
10 Claims. (Cl. 23—205)

This invention relates to a process of producing a silicon halide by reaction of silica with a halogen in the presence of an oxygen acceptor.

The terms "silicon halide" and "halogen" used herein exclude silicon fluoride and fluorine respectively.

The term "silica" used herein includes silica itself (as in the examples) and silica bearing materials e.g. zircon and spent bauxite clay after alumina extraction.

The term "reducing agent" includes especially carbon and/or carbon monoxide.

The term "alkaline earth metal" is to be understood as including magnesium.

In the preparation of high quality finely divided silica, especially for uses such as incorporation in rubber, it is essential to process the native silica in whatever form it may occur and the only known means at the moment of doing this is to convert it into a chemical compound which is capable of purification which usually involves the conversion of the silica mineral into some form of fluid state. Of the various methods of conducting such operations, the chlorination method is particularly attractive as this could, if suitable methods could be found, prove to be the more economic and practical.

Various attempts have been made to chlorinate silica which have included many methods of admixture with coke or carbon either as briquettes or by fluid bed techniques or by other well known methods and also ways have been attempted whereby the mineral which may be comminuted is subject to a reaction of chlorine and carbon monoxide gases. In general all these methods which relate to the chlorination of silica in presence of a reducing agent have been unsuccessful at temperatures below 1100° C. In consequence, the method of chlorinating silica has been indirect in nature, usually by forming an intermediate silicon compound such as silicon carbide or ferro-silicon.

More recently in British application 37,034/57 a method has been provided for chlorinating silica directly by electrolysis of a fused halide bath in which chlorine generated at the anode is brought into intimate contact with a mixture of silica and carbon affixed or adjacently located to the anode. Whilst this procedure has many advantages and particularly enables chlorination to be effected at relatively low temperatures, it presents certain problems associated with the preparation of the anode, the overcoming of certain undesirable decay features of the latter and periodic renovation of the bath, all of which are necessary in order to avoid inefficiency of operation.

It has now been found, however, that many of the above difficulties in regard to chlorination of silica can be overcome without essential recourse to the employment of excessive temperatures of chlorination or the elaboration of an electrolytic cell either of which having hitherto been essential.

According to the invention the process of producing a silicon halide consists essentially in reacting finely divided silica, in suspension in a molten alkali metal halide or an alkaline earth metal halide, or a mixture of such halides, with a halogen gas in the presence of an oxygen acceptor.

The reaction may be, and preferably is, effected at temperatures below 1100° C.

The reducing agent, when a solid such as carbon, may be present already suspended in the molten halide when the halogen is introduced, or it may be introduced at the same time as the halogen. When the oxygen acceptor is a gas such as carbon monoxide it may be introduced at the same time as, e.g. admixed with, the halogen.

The process may be performed autothermally when carbon monoxide is used as the reducing agent because the reaction is then exothermic.

When the carbon is used as the reducing agent the reaction is endothermic at temperatures above 750° C. and although there may be some reaction at 700° C., normally this reaction requires auxiliary heat to maintain the temperature. This may be introduced by external heating or preheating of the reactants or by generating heat within the bath, as for instance, by the use of electric current, especially an A.C. current, or by injecting oxygen to react with the carbon. If oygen is injected the carbon may be introduced entrained in it.

It is a surprising result that as distinct from previous methods employed in the art as, for instance, in chlorination by the older fluid bed chlorination techniques, the reaction according to the present invention may be conducted at temperatures below 1100° C. with a high efficiency.

According to one embodiment of the invention there is employed a vessel constructed of ceramic material resistant to corrosion by the molten halide to be contained therein. The outside wall of the vessel is provided with electric wiring for the supply of heat and the whole being suitably insulated to prevent excessive losses of heat. The vessel is preferably cylindrical in shape and is provided with ports:

(a) For the introduction of chlorine or a chlorine-containing gas;

(b) For the introduction of silica and of carbon if not introduced by entrainment in the chlorine or chlorine-containing gas;

(c) For the removal of the reaction product gases which are generated;

(d) A port with suitable gland for an agitator which is desirably employed.

The salt or mixture of salts, e.g. calcium chloride, sodium chloride or calcium chloride-sodium chloride respectively is introduced into the vessel and the latter is heated to the reaction temperature in the range of 600° C. to 1000° C. when the ground mixture of silica and carbon is admitted and stirred into the molten salt by means of the agitator to give a uniform distribution. Chlorine is then passed through this mass which is maintained at the reaction temperature, and the gases resulting from the reaction of the chlorine with the mixture of silica and carbon contained in the bath, which gases include the desired silicon tetrachloride, are removed from the chamber to be suitably condensed to recover the silicon tetrachloride.

It will be understood that other salts may be used such as those of potassium, magnesium, barium strontium. The various salts have a considerable range of melting points and enable a choice to be made of a suitable salt or combination of salts to cover the range of temperature of the reaction. The selected salt or salt mixture may depend also on the halogenating agent in that it is preferred to use chlorides when the halogenating agent is chlorine or bromides when it is bromine.

The silica used, including spent bauxitic clay derived from alumina extraction, for halogenation and especially chlorination will contain at least 25%, preferably at least 80% and desirably 99% $SiO_2$, and it may be used in the form of sand, i.e. with a particle size of from 76–1000μ. Preferably, a much finer material is desirable both in respect of maintaining a good distribution in the molten halide bath and furthermore, to present a larger surface of reaction. In consequence, the sand is normally comminuted by any well-known type of grinding machinery which, for instance, may be a ball mill, to a condition whereby it will substantially pass through a 240 mesh B.S.S. (76μ) sieve. Even particles of smaller size, e.g. 44μ are more advantageous but this is a matter for decision by one skilled in the art. The carbonaceous material is similarly ground although it need not be ground to the same size as the silica and the average particle size is usually for instance at least about twice the average size of the silica to be chlorinated.

Where zircon is to be halogenated the material will normally be in the form of sand containing 25 to 33% $SiO_2$ and 60 to 70% $ZrO_2$. Preferably this sand will be ground.

The carbon used may be coke, graphite, anthracite or the like material having a high carbon content and may vary in size from 50μ to 2 inches, preferably in a finely divided form which may be less than 500μ.

The amount of silica and coke in admixture which may be present in the bath may obviously be varied over a wide range depending on the size of the solid particles added, the viscosity of the bath and the degree of agitation required. For illustration only, the bath may contain from 1 to 20% by weight of silica and from 0.5 to 10% of carbon by weight and the ratio of silica to carbon (coke) will normally be between 3:1 and 2:1.

The chlorine used for chlorination may, if necessary, be preheated and its method of distribution, i.e. by the admission and bubbling through the molten chloride mass can considerably affect the efficiency normally to be obtained.

In another embodiment of the invention, chlorination of silica is effected in the molten halide bath by the passage of chlorine and carbon monoxide through the halide bath. The gases may be admitted separately or they may be pre-admixed. Reaction under these conditions is exothermic within the range of temperatures up to 1100° C. and obviously has distinct advantages in this aspect particularly over the method by which the carbon is used as reducing agent in solid suspension in the molten halide bath. With a plant of adequate size and suitably insulated it is possible by admission of a mixture of chlorine and carbon monoxide into the suspension to maintain the bath within the temperature range without the employment of any form of auxiliary heating. Such a plant may vary to a considerable extent according to the volume of the gases per unit area of horizontal section passing upward through the molten salt bath. That is to say, with a relatively small volume of gases distributed per unit area into the base of the molten salt bath, the cross-sectional area of said bath would have to be greater to effect autothermal conditions than when a relatively large volume of gases is employed per unit area. Thus, with a reactor suitably insulated it is possible to maintain autothermal conditions where the reactor is of the order of 2 feet or more in diameter. It will be understood from what has been stated that this condition is dependent upon the volume of the gases per unit of cross-sectional area moving upward, and that when there is a lesser gas stream a larger diameter will be required.

The chlorine and carbon monoxide may be admitted in the form of phosgene but there is no advantage, particularly from an autothermal stand-point, in so doing.

The performance of the process of the invention will vary to some extent according to the particle size of the siliceous and carbon products fed into the molten bath and to a lesser extent the viscosity of the bath will also play a part. However, it will be seen that the proportions of the solid reactants added to the bath may vary over quite a large range according to their physical condition when admitted. It will also follow that the conditions of distribution will vary considerably according to the degree to which the solids will segregate in the molten mass. This again particularly applies to the particle size and density of the particles admitted.

The state of distribution will also depend on the manner of introduction of the halogen gas. If it is admitted in a fine gas stream it may provide agitation adequate to maintain the particles in suspension and well distributed. On the other hand where the particles are prone to segregate, a degree of mechanical agitation and hence agitating equipment is, under these circumstances, desirable. The temperature at which chlorination may be conducted according to the invention is limited in its lower range by the rate of reaction which for practical purposes is at 800° C. The upper range of temperature is determined by economics but as hereinbefore stated it is not necessary to work above 1100° C., the main objective being to operate efficiently at the lowest temperature possible and this is within the range 800–1100° C.

It has been found that halogenation as conducted according to the invention may be accelerated in a surprising fashion by the presence in the bath of certain catalysts namely boron and boron compounds, especially boron halides, excluding fluoride. Boron chloride $BCl_3$ is particularly effective. Various boron compounds may be used which are capable of reacting with halogen gases within the temperatures of chlorination to produce boron halides. If these boron compounds are solids they may be added with the solid reagents. Examples of such boron compounds are borides, such as boron carbides or ferro-boron, anhydrous boric oxide, or anhydrous borates of various metals particularly alkali metals or alkaline earth metals, e.g. anhydrous borax.

Preferably, however, the boron compounds are those such as boron chloride which are volatile at relatively low temperatures and which are more easily and more efficiently admitted by admixture in vapour form with the halogen (chlorine) or halogen (chlorine) gases used for halogenation (chlorination). If these boron compounds are employed there should be carbon present in the molten bath.

In the same way that the halides or halide mixture of salts composing the bath will normally correspond to the particular selected halogenating agent to be employed, the boron halide will preferably be a compound of boron with the halogenating agent used.

The boron halide employed in accelerating the reaction is recoverable and may be recycled. Thus, for instance, in the chlorination of silica, boron chloride may serve as an accelerating agent, normally admitted with the chlorine and is subsequently found in the gases emitted from the molten salt bath and may be recovered therefrom for subsequent recycling.

The following examples are given for the purpose of illustrating the invention:

*Example 1*

In a cylindrical container 2" in diameter and 12" high, a bath of molten calcium chloride of 3" depth was prepared at a temperature of 1000° C. To this was added 10 grams silica ground to pass a 325 mesh B.S.s., and 5 grams of coke similarly ground. Through this mixture 0.1 litre/minute of chlorine was introduced. Operating for a period of 1 hour the efficiency of chlorination was 33.8%.

Operating in the same way but using mechanical agitation (slow speed stirring) to enable better distribution of the silica and carbon within the molten mass, and again operating for a period of one hour, the efficiency obtained was 52.6%.

By contrast, employing a vertical vessel 2" in diameter, 36" high, with a perforated base plate supporting a 10" depth of a silica-coke mixture at 1000° C., and passing a stream of chlorine up through the base plate so as to fluidise the mixture, the efficiency of the chlorination over a period of 1 hour was less than 6%, even when catalysts, e.g. boron trichloride, were added to the chlorine stream.

*Example 2*

In a vessel similar to that described in Example 1 with a sodium chloride bath, the ground silica and ground coke were added in the same proportion as before. The chlorine stream was also admitted at the same rate and had present therein 18.5% boron chloride vapour, the percentage being calculated by volume in relation to the chlorine content. Under these circumstances the chlorine efficiency was 27.6% which shows an improvement due to the use of boron chloride as catalyst, since working in the same way but without the use of boron chloride the chlorine efficiency was 19.4%.

*Example 3*

In a vessel similar to that described in Example 1 the same volume of strontium chloride melt was produced and ground silica sand and ground coke in the same proportions were added. The chlorine was admitted at the rate of 0.1 litre/minute as in Example 1 and the chlorine efficiency was 33%.

*Example 4*

Under the conditions as described in Example 1 except that ground coke was not added to the molten salt bath, carbon monoxide was additionally admitted with the chlorine gas at the rate of 0.26 litre/minute. Under these conditions for a period of 1 hour, the efficiency of chlorination was 31.5%.

*Example 5*

In a vessel similar to that used in Example 1 and containing the same quantity of molten calcium chloride, was added 70 grams of silica, particle size 76–250$\mu$, chlorine and carbon monoxide being admitted at the rate of 0.1 and 0.2 litre per minute respectively. Operating over a period of 1 hour, the efficiency of chlorination was 20.2%.

*Example 6*

Similar to Example 1 but operating at a temperature of 800° C. for a period of 1 hour, the efficiency of chlorination was 15%.

*Example 7*

In a vessel with internal dimensions 4' diameter 8' high, lined by chlorine resisting alumina-silicate brickwork externally surrounded by an insulating brick the whole being contained within a steel shell, molten calcium chloride was introduced at a temperature of 1000° C. and to a depth of 5 ft. To this melt was added 1300 lbs. of unground silica sand having a particle size range of 76–250$\mu$. The gases were admitted through a plurality of jets on the base of the vessel and connected to one common manifold. Into this manifold a mixture of chlorine and carbon monoxide in the proportion 124:54 lbs. per hour respectively were admitted at a pressure of 30 lbs. per sq. in. By this means the gases were distributed through the melt, the contact with the molten mass being enhanced by a slow speed stirrer, constructed of alumina-silicate material. The gases emerging from the surface of the melt were led from the vessel to be cooled to a temperature of −30° C. to remove essentially the greater part of the silicon tetrachloride content in liquid form. The residual gases were subsequently scrubbed to remove residual chlorine and the gas was then discharged to atmosphere. By this means it was found that the gases following condensation of the silicon tetrachloride contained chlorine equivalent to 4% of the chlorine admitted to the molten salt bath. That is to say, it indicated a chlorine utilisation of 96%. The operation was continued over a period of 5 hours, the silica content being replenished periodically at the rate of 51 lbs. per hour. Throughout the temperature of the melt was maintained 960–1030° C. without recourse to the use of auxiliary heat.

*Example 8*

The apparatus used in this example was a silica vessel 6" in diameter and 14" high, electrically wound externally for heating purposes. Inside this vessel was a corrosion-resistant crucible in the form of two truncated cones inverted with respect to one another and sealed together, the lowest part being closed at the bottom, the upper part having a brick bung inserted therein. Through this brick bung there was a delivery tube extending towards the bottom of the crucible for injecting chlorine and an exit gas tube for gaseous products of reaction. Also through the brick bung are inserted a pyrometer sheath and an agitator. This vessel contained 800 ccs. of molten sodium chloride to which was added 100 grams of ground silica sand and 75 grms. of ground coke of particle size similar to that described in Example 1. The vessel was heated to a temperature of 860° C. and chlorine was passed through the molten mass at the rate of 0.5 litre per minute for a period of 60 minutes. Under these conditions the chlorine utilisation was 22%.

*Example 9*

Operating under similar conditions as described in Example 8 the temperature was maintained at 1000° C. and the average chlorine utilisation was 58%.

What is claimed is:

1. The process of producing silicon tetrahalide consisting substantially in forming a molten bath of a metal salt selected from the group consisting of alkali metal halides, alkaline earth metal halides, and mixtures thereof; introducing a reducing agent, a halogen gas, and silica of at least 25% $SiO_2$ purity into said bath to be well distributed therein for reaction at between about 600 and 1100° C.; withdrawing the silicon tetrahalide and other vapourous products from above the surface of said bath and recovering the silicon tetrahalide; the weight of said metal salt in said bath being kept substantially in excess of the weight of $SiO_2$ in said bath.

2. The process of claim 1 in which the reaction is effected under autothermal conditions.

3. The process of claim 1 in which the reducing agent is selected from the group consisting of carbon and carbon monoxide.

4. The process of claim 1 in which the silica is of at least 80% $SiO_2$ purity.

5. The process of claim 1 in which the reducing agent is carbon and in which the molten bath contains 1–20% by weight of $SiO_2$ and 0.5–10% by weight of carbon, the weight ratio of $SiO_2$ to carbon being from 3:1 to 2:1.

6. The process of claim 1 in which there is present during the reaction a boron-containing substance serving as an accelerator for the reaction.

7. The process of producing silicon tetrachloride consisting substantially in forming a molten bath of a metal salt selected from the group consisting of sodium chloride, calcium chloride, and mixtures thereof; introducing chlorine gas, a reducing agent selected from the group consisting of carbon and carbon monoxide, and silica of at least 25% $SiO_2$ purity into said bath to be well distributed therein for reaction at between about 600 and 1100° C.; withdrawing the silicon tetrachloride and other vaporous products from above the surface of said bath and recovering the silicon tetrachloride; the weight of said metal salt in said bath being kept substantially in excess of the weight of $SiO_2$ in said bath.

8. The process of claim 7, in which the reaction is effected under autothermal conditions and the silica is of at least 80% $SiO_2$ purity.

9. The process of claim 7 in which the reducing agent is carbon and the bath contains 1–20% by weight of $SiO_2$ and 0.5–10% by weight of carbon, the weight ratio of $SiO_2$ to carbon being from 3:1 to 2:1.

10. The process of claim 7 in which boron chloride is admitted in vapour form into the molten bath, carbon being present in the molten bath.

References Cited in the file of this patent

UNITED STATES PATENTS

| | | |
|---|---|---|
| 2,942,950 | Pallister | June 28, 1960 |
| 2,952,513 | Wigton | Sept. 13, 1960 |

FOREIGN PATENTS

| | | |
|---|---|---|
| 781,220 | Great Britain | Aug. 14, 1957 |

OTHER REFERENCES

Mellor: "A Comprehensive Treatise on Inorganic and Theoretical Chemistry," Longmans, Green and Company, New York, volume 6, 1925, pages 960–962.